United States Patent [19]

Manning

[11] Patent Number: 5,467,192
[45] Date of Patent: Nov. 14, 1995

[54] IMPROVEMENTS IN OR RELATING TO SURFACE CURVATURE MEASUREMENT

[75] Inventor: Kevin R. Manning, Rose Farm, England

[73] Assignee: Roke Manor Research Limited, Hampshire, England

[21] Appl. No.: 348,834

[22] Filed: Nov. 29, 1994

Related U.S. Application Data

[63] Continuation of Ser. No. 30,921, Mar. 12, 1993, abandoned.

[30] Foreign Application Priority Data

Mar. 14, 1992 [GB] United Kingdom .................... 9205655
Jun. 26, 1992 [GB] United Kingdom .................... 9213626

[51] Int. Cl.[6] .................................................. G01B 15/04
[52] U.S. Cl. .................................... 356/371; 356/124
[58] Field of Search ................................ 356/371, 124, 356/127, 381

[56] References Cited

U.S. PATENT DOCUMENTS

| 4,289,400 | 9/1981 | Kubota et al. | 356/371 |
| 4,332,477 | 6/1982 | Sato | 356/371 |
| 4,390,277 | 6/1983 | Quinn | 356/371 |
| 4,410,267 | 10/1983 | Shindow et al. | |
| 4,412,743 | 11/1983 | Eberly | 356/371 |
| 4,425,041 | 1/1984 | Nishiyama | 356/371 |
| 4,588,270 | 5/1986 | Tamaki | |
| 5,210,592 | 5/1993 | Bretschneider | 356/371 |
| 5,251,010 | 10/1993 | Maltby | 356/371 |

FOREIGN PATENT DOCUMENTS

| 317768 | 5/1989 | European Pat. Off. | |
| 237005 | 10/1986 | Japan | 356/371 |
| 51009 | 2/1990 | Japan | 356/371 |
| 1563286 | 3/1980 | United Kingdom | |

OTHER PUBLICATIONS

Jenkins et al, *Fundamentals of Optics*, McGraw–Hill Book Company, copyright 1957, pp. 86–89.

*Primary Examiner*—Richard A. Rosenberger
*Attorney, Agent, or Firm*—Keck, Mahin & Cate

[57] ABSTRACT

An apparatus for the measurement of the curvature of a surface includes at least one source of electromagnetic radiation, an electromagnetic radiation detector, and a lens positioned and arranged to focus source radiation reflected from the surface onto the detector. The detector is arranged to provide an output signal characteristic of a position thereon at which the radiation is incident. A signal processor, responsive to the output signal, provides an indication appertaining to curvature of the surface.

13 Claims, 8 Drawing Sheets

IMPROVEMENTS IN OR RELATING TO SURFACE CURVATURE MEASUREMENT

This is a continuation of application Ser. No. 08/030,921 filed Mar. 12, 1993, abandoned.

This invention relates to apparatus for the measurement of surface curvature and more especially, but not exclusively, it relates to apparatus for the measurement of the curvature of a lens.

The curvature of lenses for optical purposes for use either in the visible or the non-visible spectrum, or the curvature of microwave lenses, must be precise for many applications and thus it is necessary to provide apparatus which can be used (e.g. during manufacture) for curvature measurement purposes.

Known methods of measurement comprise apparatus which generally falls into one or other of two categories. The first category comprises contact methods and the second category comprises non-contact methods.

Contact methods primarily comprise an instrument, called a spherometer, which measures the height of the surface from a plane defined by a ring that rests on the measurement surface. The relationship which obtains between this height and the diameter of the ring, can be used to provide the radius of curvature. Another contact method uses test plates, which have a radius of curvature very close to the radius that is being measured. Thus when a test plate is placed in contact with the surface under measurement, usually by edge contact, and a monochromatic light is arranged to illuminate the surface, interference fringes will be seen. The number of fringes indicates the difference between the measurement surface and the test surface. These contact methods can however physically damage the surface.

Non-contact methods, which do not cause physical damage, are usually preferred. Known non-contact methods make use of an interferometer with internal test spheres. With this instrument, a surface to be measured is arranged to reflect a convergent cone of monochromatic light from the interferometer back into the instrument. This is done at two positions, one of which is when an emergent cone is focused at the surface and the other of which is when its focus is coincident with the centre of the radius of curvature. At these positions interference fringes are seen and when the number of fringes is a minimum the required position is found. The distance that the surface is moved is thus the radius of the surface. Another method requires the use of an autocollimator and performs the measurements in a similar way to the interferometer but relies on the observation of the focused spot rather than the interference fringes. These known non-contact methods are however somewhat inconvenient in practice.

It is an object of the present invention to provide apparatus for the measurement of lens curvature which is convenient and simple to use.

According to the present invention apparatus for the measurement of the curvature of a surface comprises at least one source of electromagnetic radiation, electromagnetic radiation detector means, lens means positioned and arranged to focus source radiation reflected from the said surface onto the said detector means, characterised in that the said detector means is arranged to provide an output signal characteristic of a position thereon whereat the radiation is incident and signal processor means responsive to the said output signal for providing an indication appertaining to curvature of the said surface.

Although the said source may comprise a millimetric microwave electromagnetic radiator, it is envisaged that the said source would normally comprise a light radiator, which might conveniently be a laser, and that accordingly the said detector means would be responsive to light radiation (in the visible or non-visible spectrum) emitted therefrom.

The apparatus may comprise a beam splitter via which light radiation from the source is directed onto the surface, the beam splitter being positioned between the detector means and the surface.

The beam splitter may be positioned between the lens means and the surface.

Alternatively the beam splitter may be positioned between the detector means and the lens means.

The apparatus may be mounted on an optical bench for movement in a plane substantially orthogonal to the optical axis of the lens means.

Alternatively the apparatus may be arranged to be hand held and may comprise an additional light detector arranged to provide signals for the signal processor.

The additional detector may according to one embodiment be arranged to be responsive to light from the source which is directed onto the surface via a further beam splitter and via which further beam splitter light reflected from the surface is arranged to pass to the said additional detector.

According to an alternative embodiment, however, the additional detector may be arranged to be responsive to light reflected from the surface and originating from a further light source, light from the said further source being directed to and from the surface via a further beam splitter.

The apparatus may comprise an automatic focusing arrangement for focusing light from the source onto the surface, as the beam is scanned across the meridional plane of the surface. Thus a reflected return from the surface is imaged onto the detector and deviations from the expected position are noted. The deviations are caused by surface quality defects, e.g. roughness, and may be stored for subsequent analysis and output as a measure of the surface quality.

The automatic focusing arrangement may form a part of the lens means.

The additional detector may comprise an "on-axis" detector for providing an indication when light incident upon the further detector is reflected from the surface so as to be orthogonal to the said optical axis.

The detector means may comprise an array of photosensitive elements, signals from which provide an indication of the position thereon whereat light is incident.

Alternatively the detector means may comprise an optical detector arrangement which is equivalent to an optical potentiometer.

Some embodiments of the invention will now be described solely by way of example, with reference to the accompanying drawings, in which.

Figure 1:
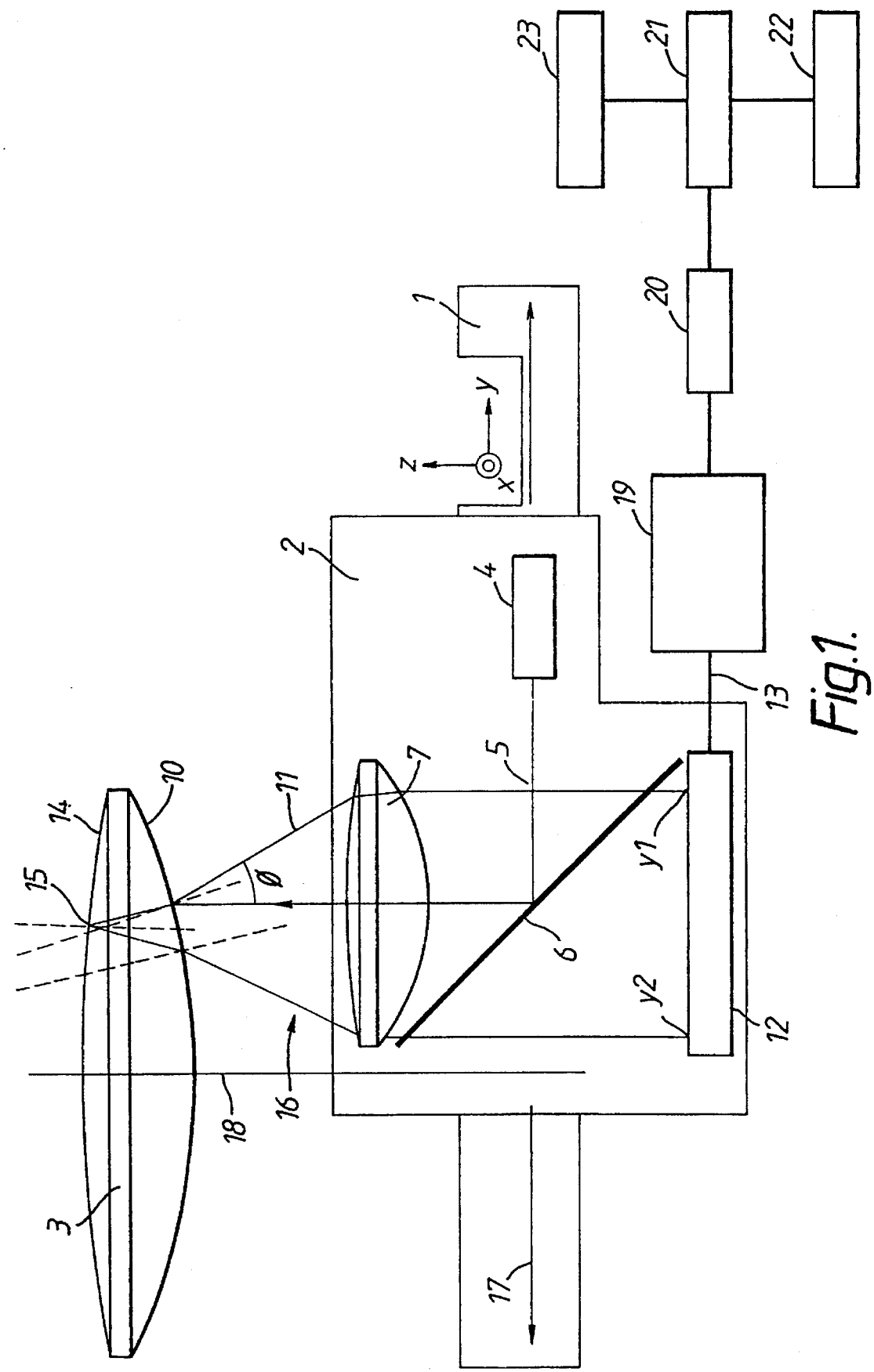
FIG. 1 is a block schematic diagram of apparatus in accordance with one embodiment of the invention for measuring the curvature of a lens.

Referring now to FIG. 1, apparatus for measuring the curvature of a lens comprises a rigidly mounted optical bench 1 on which a platform 2 is slidably mounted for movement with respect to a lens 3 under test. Mounted on the platform 2 is a laser light source 4 which is arranged to direct a beam of light 5 towards a beam splitter 6. The beam 5 from the source 4 is reflected from the beam splitter 6 through a transform lens 7 so as to be collimated or focused at a point 9 on an outer surface 10 of the lens 3. Reflection from the point 9 results in a beam 11 which is focused by the transform lens 7 onto an elongate detector 12 which comprises a photo-diode array. The beam 11 is incident on the detector 12 at a point y1, a signal being produced on an output line 13 from the detector 12 which is indicative of the position y1 whereat the beam 11 is incident upon the detector 12. With the position of the platform 2 as shown in FIG. 1, light is also reflected from the rear surface 14 of the lens 3 at a point 15 thereby to produce a beam 16 which is focused by the transform lens 7 onto a point y2 on the detector 12.

As the platform 2 is moved in the direction indicated by an arrow 17, the points y1 and y2 will tend to move together until they are coincident when the beam 5 is on the lens axis 18.

It will be appreciated that by measuring the distance moved by the platform from the optic axis and determining the angles of the beams 11 or 16, made with this axis, surface curvature can be precisely measured provided the law of curvature is known, i.e. spherical or parabolic etc. If the law of curvature is not known, then a number of measurements can be taken in order to calculate the curvature of the surface 10, or the curvature of the surface 14. In order to facilitate automatic computation of the curvature, signals on the line 13 are fed to an analogue to digital converter 19, which produces digital signals which are fed to a store 20. Thus digital signals may be stored corresponding to the position of the platform 2 when the beam 5 is coincident with the axis 18 and when the beams 11 and 16 are projected at angles which correspond to positions of the points y1 and y2 on the detector 12.

It will be appreciated that this method of measuring radius of curvature assumes that the beams are scanned in the meridional plane of the lens 3 under test. It is therefore necessary to move the assembly 2 in the x direction, to find the vertex of the lens and therefore its meridional plane.

From this stored digital information it is a relatively simple matter to compute by means of a processor 21, which may be operated under the control of a keyboard 22, data corresponding to the curvature of the surface 10 or the curvature of the surface 14 of the lens 3, which data may be displayed on a display unit 23.

It will be appreciated that the arrangement of FIG. 1 may be modified by simply transposing the relative positions of the source 4 and the detector 12 thereby to produce an exactly equivalent alternative arrangement.

Figure 2:
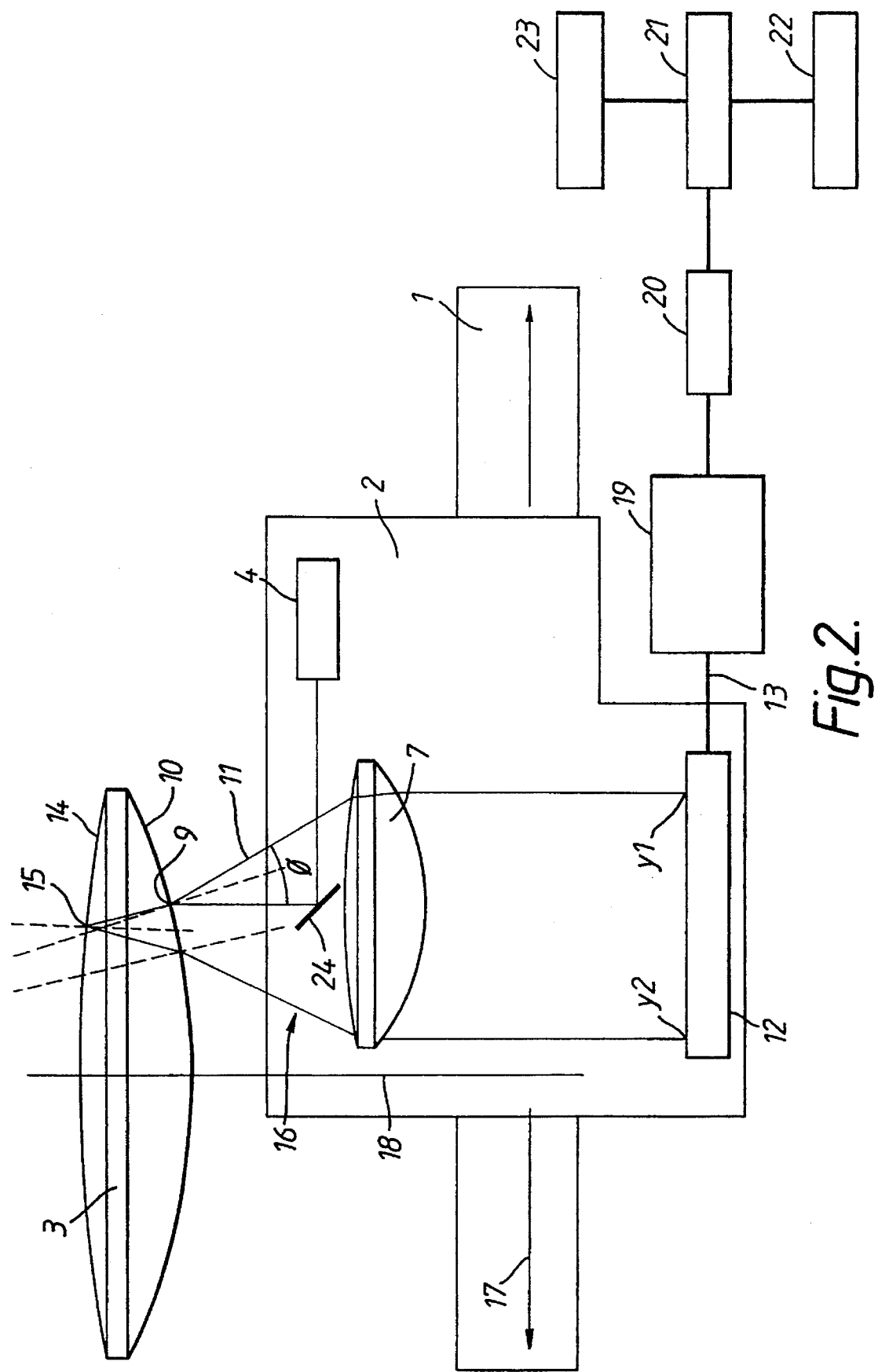
FIG. 2 is a block schematic diagram of apparatus in accordance with an alternative ,embodiment of the invention for measuring the curvature of the lens.

Referring now to FIG. 2, wherein corresponding parts of the apparatus bear the same numerical designations as in FIG. 1, a similar arrangement is shown but instead of using a beam splitter 6, positioned between the detector 12 and the transform lens 7, as shown in FIG. 1, a beam splitter 24 is used which is positioned between the lens 3 and the transform lens 7. It will be appreciated that with the arrangement as shown in FIG. 2, similar results are achieved but the transform lens does not of course serve to focus light from the source 4 onto the surfaces of the lens 3, and thus it is collimated or focused independently by optics internal to the source.

Figure 3:
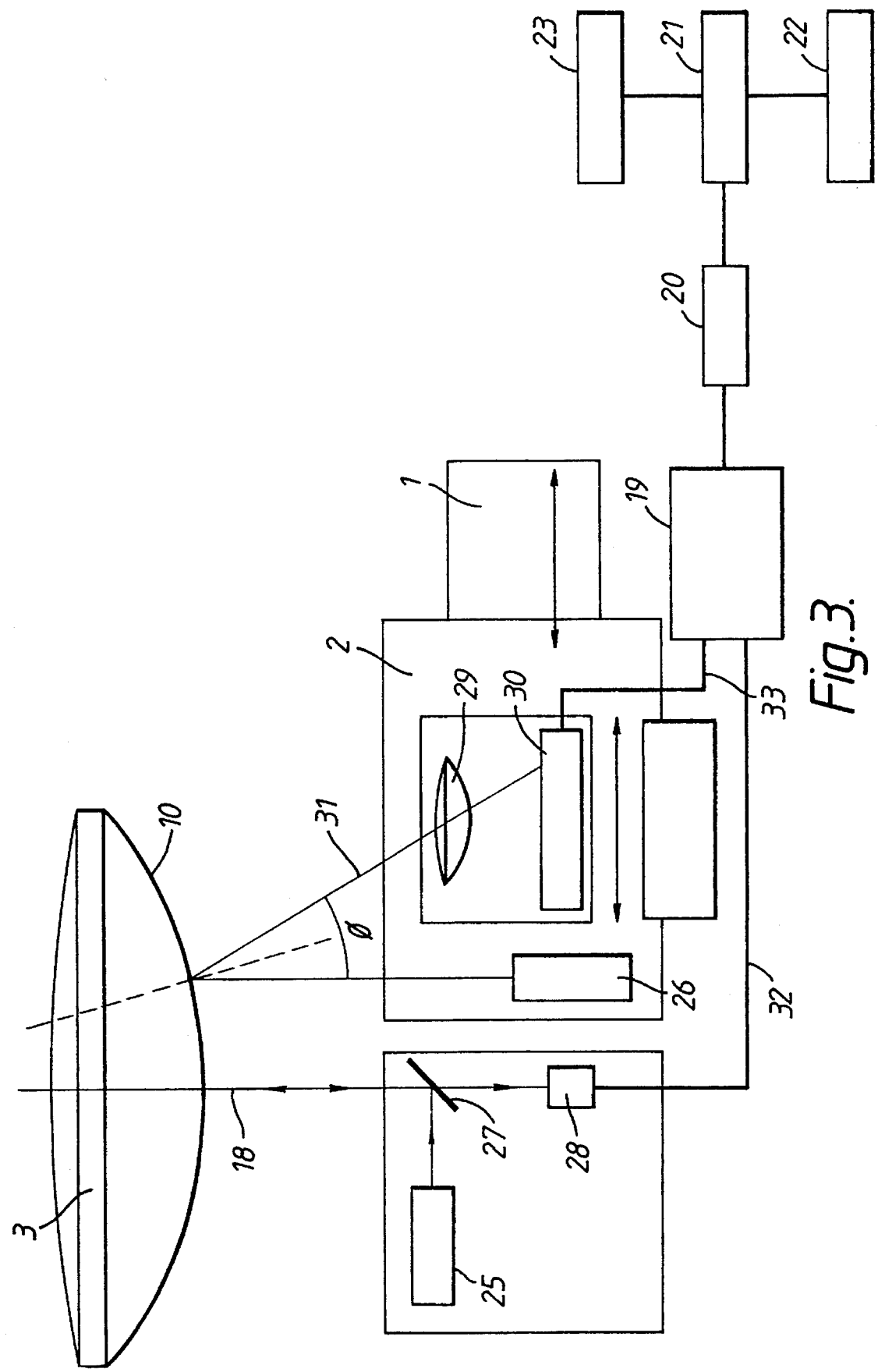
FIG. 3 is a block schematic diagram of apparatus in accordance with a further embodiment of the invention for measuring the curvature of a lens.

The arrangements just before described with reference to FIG. 1 and FIG. 2 use a single light source 4, however, in an alternative arrangement, as shown in FIG. 3, two light sources 25 and 26 are used. The light source 25 is used in conjunction with a beam splitter 27 and an optical detector 28 to establish the position of the optical axis 18, and the source 26 is used in conjunction with a transform lens 29 and an optical detector 30 which is similar to the detector 12, to determine the angle of a reflected beam 31 from the surface 10 of the lens 3. The position of the platform 2, relative to the axis 18, is also recorded. Analogue signals corresponding to these positions are fed via lines 32 and 33 respectively to the analogue to digital converter 19 and a processing operation is thereafter carried out as described with reference to FIG. 1 in order to produce a data display at the display unit 23 which corresponds to the curvature of the lens.

Figure 4:
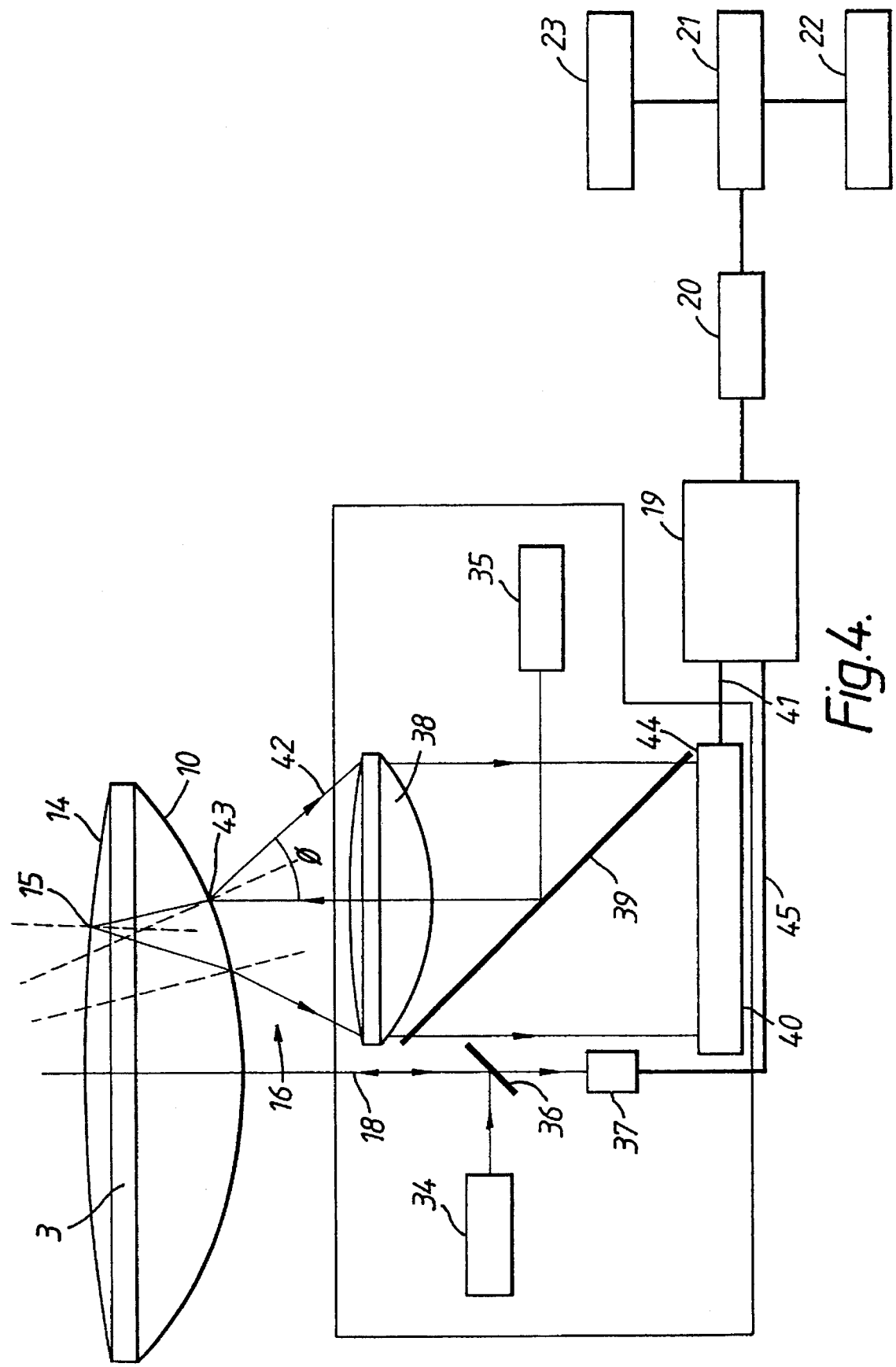
FIG. 4 is a block schematic diagram of a hand held instrument for measuring the curvature of a lens.

In the arrangements so far described with reference to FIGS. 1, 2 and 3 an optical bench has been used wherein the platform 2 is moveable to produce digital signals in dependence upon lens curvature, whereby the curvature may be measured. However, as shown in FIG. 4, a hand held instrument may be fabricated comprising two light sources 34 and 35. The light source 34 is used in conjunction with a beam splitter 36 and a optical detector 37 to establish the position of the optical axis 18 of the lens 3 under test and the light source 35 is used in conjunction with a transform lens 38, a beam splitter 39 and an optical detector 40 to produce an analogue signal on a line 41 corresponding to a point 44 on the detector 40 whereat a beam 42, derived from the source 35 and reflected from a point 43, is incident. This point 44 is characteristic of an angle Ø subtended by the beam 42 with respect to the optical axis 18.

In use of this apparatus as shown in FIG. 4, the surface of the lens 3 is scanned by the hand held apparatus and when the optical axis 18 is detected as indicated by an appropriate signal on a line 45, the corresponding signal on the line 41 is automatically translated to a corresponding digital signal in the analogue to digital converter 19 and stored in the store 20. The subsequent signal processing is thereafter effected as hereinbefore described with reference to FIG. 1. It will of course be appreciated that an efficient method of detecting the optical axis 18 during a manual scan must be devised to store at the instant of axis detection, a digital signal corresponding to the signal on the line 41. An alternative way, to that used for previous figures of detecting the optical axis during a manual scanning operation will hereinafter be described with reference to FIG. 6.

Figure 5:
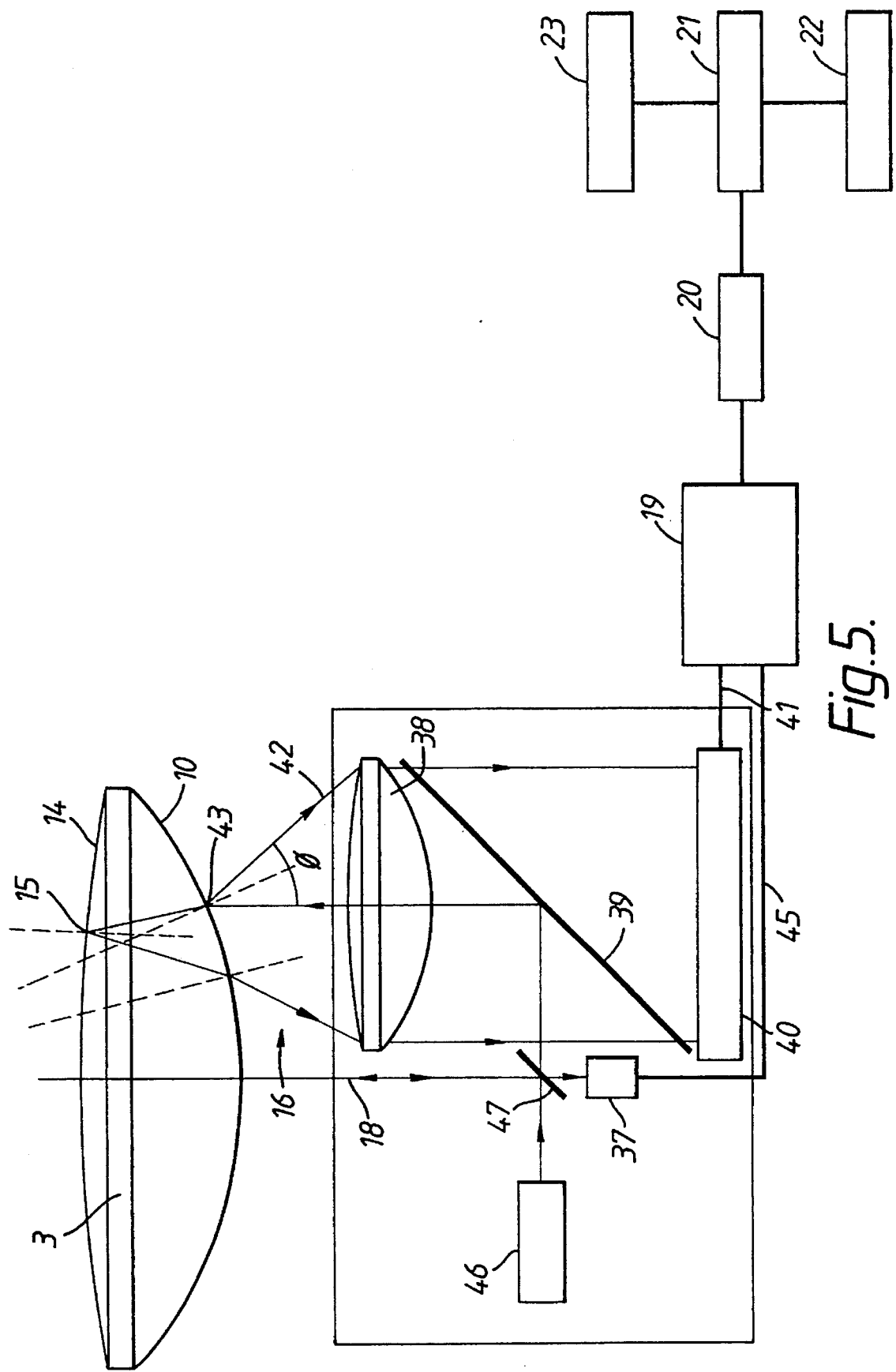
FIG. 5 is a block schematic diagram of an alternative hand held instrument for measuring the curvature of a lens.

Referring firstly to FIG. 5 however, in an alternative embodiment of the invention as applied to a hand held instrument, a single light source 46 may be used as shown in FIG. 5, wherein parts corresponding to FIG. 4 bear the same numerical designations. In FIG. 5 it can be seen that the source 46 is used in conjunction with a beam splitter 47 and a detector 37 to produce signals on the line 45 corresponding to the position of the optical axis 18. Light from the source is also used to produce the beam 42, as shown in FIG. 5, and this is achieved by changing the position of the beam splitter 39 from the position as shown in FIG. 4 to a new position as shown in FIG. 5, whereby light from the source 46 is directed onto the surface 10 of the lens 3 at the point 43 thereby to produce the reflected beam 42.

Figure 5A:
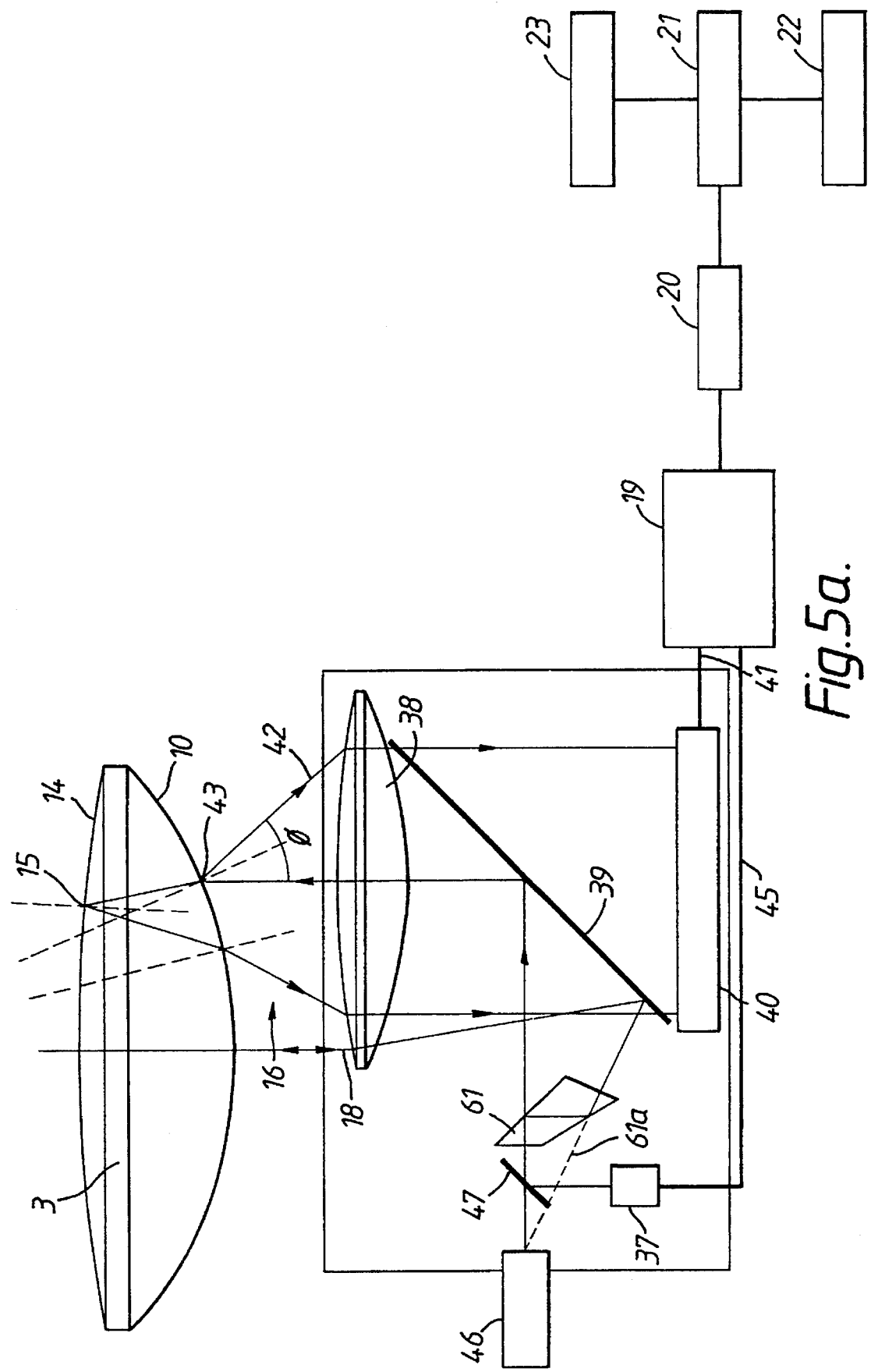
FIG. 5a is an alternative arrangement to FIG. 5, wherein two beams are generated from a single source.

Alternatively, as shown in FIG. 5a, two beams may be generated from one source. In this arrangement an additional element defined by a prism 61 is used, which comprises a semi-reflecting coating on a surface which is at 45° to the incident beam. A totally reflecting surface is on the prism face that the beam impinges upon when partially reflected from the semi-reflecting coating. The beam when reflected from this totally reflecting surface exits the prism via a face that is normal to the beam. This beam when projected backwards, as indicated by broken line 61a, appears to emanate from a point on the incident beam to the prism. If this point is arranged, by moving the prism, to be at the focus of the lens 38 then the two beams that emerge from this lens will be parallel to each other, which is required for the accurate operation of the instrument. All measurements are accomplished as previously described in connection with FIGS. 4 and 5.

Figure 6:
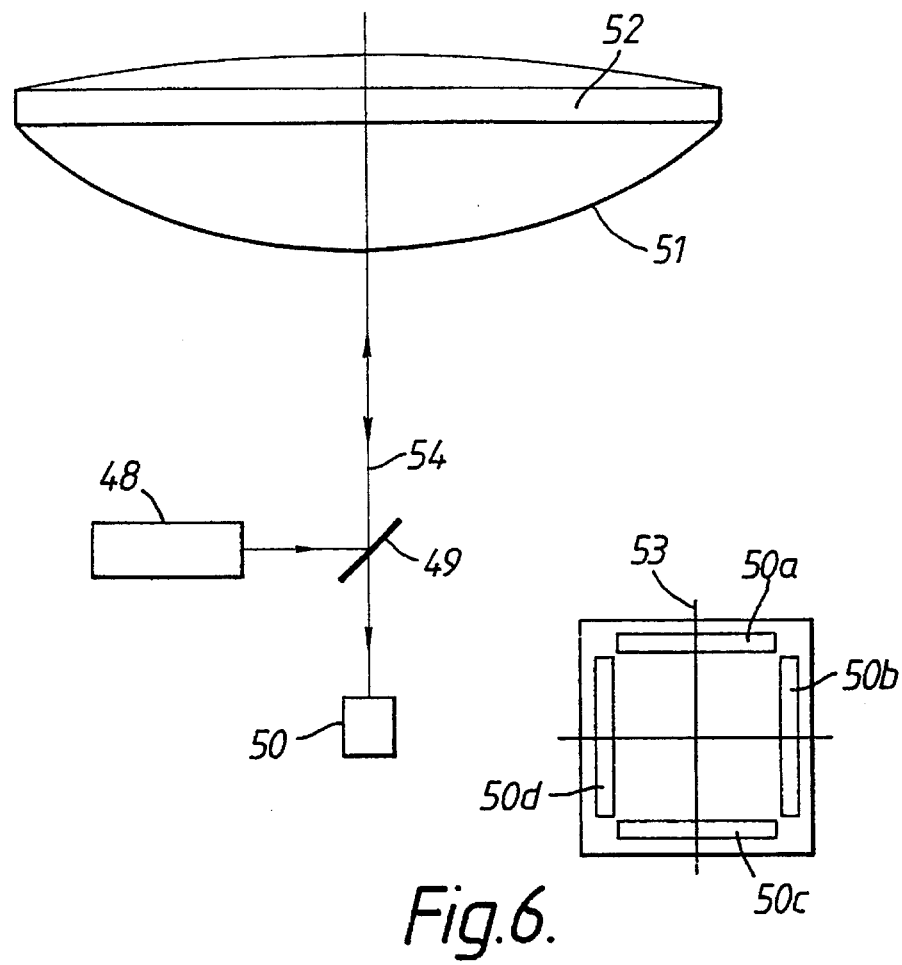
FIG. 6 is a block schematic diagram of an alternative apparatus for automatically determining the position of an optical axis.

As has already been mentioned and as will readily be appreciated, it is necessary with the hand held arrangement just before described with reference to FIGS. 4 and 5, accurately to determine, during a manual scan, the position of the optical axis 18 and this may alternatively be achieved by means of apparatus as shown in FIG. 6. The arrangement as shown in FIG. 6 comprises a light source 48 which is operatively associated with a beam splitter 49 and a light detector 50. Light originating from the source 48 and reflected from the beam splitter 49 is directed onto the surface 51 of a lens under test 52. The detector 50 comprises four detector elements 50a, 50b, 50c and 50d. Light is directed onto the detector elements 50a, 50b, 50c and 50d, through an alignment cross 53. Thus, it will be appreciated that when the reflected and incident beams are aligned on the optical axis 54, as shown in FIG. 6, the shadow of the cross will be symmetrically positioned with respect to the detector elements 50a, 50b, 50c and 50d, thereby to produce a characteristic output signal which is detectable and detection of which in this symmetrical position indicates the required positioning of the instrument in line with the optical axis 54.

Figure 7:
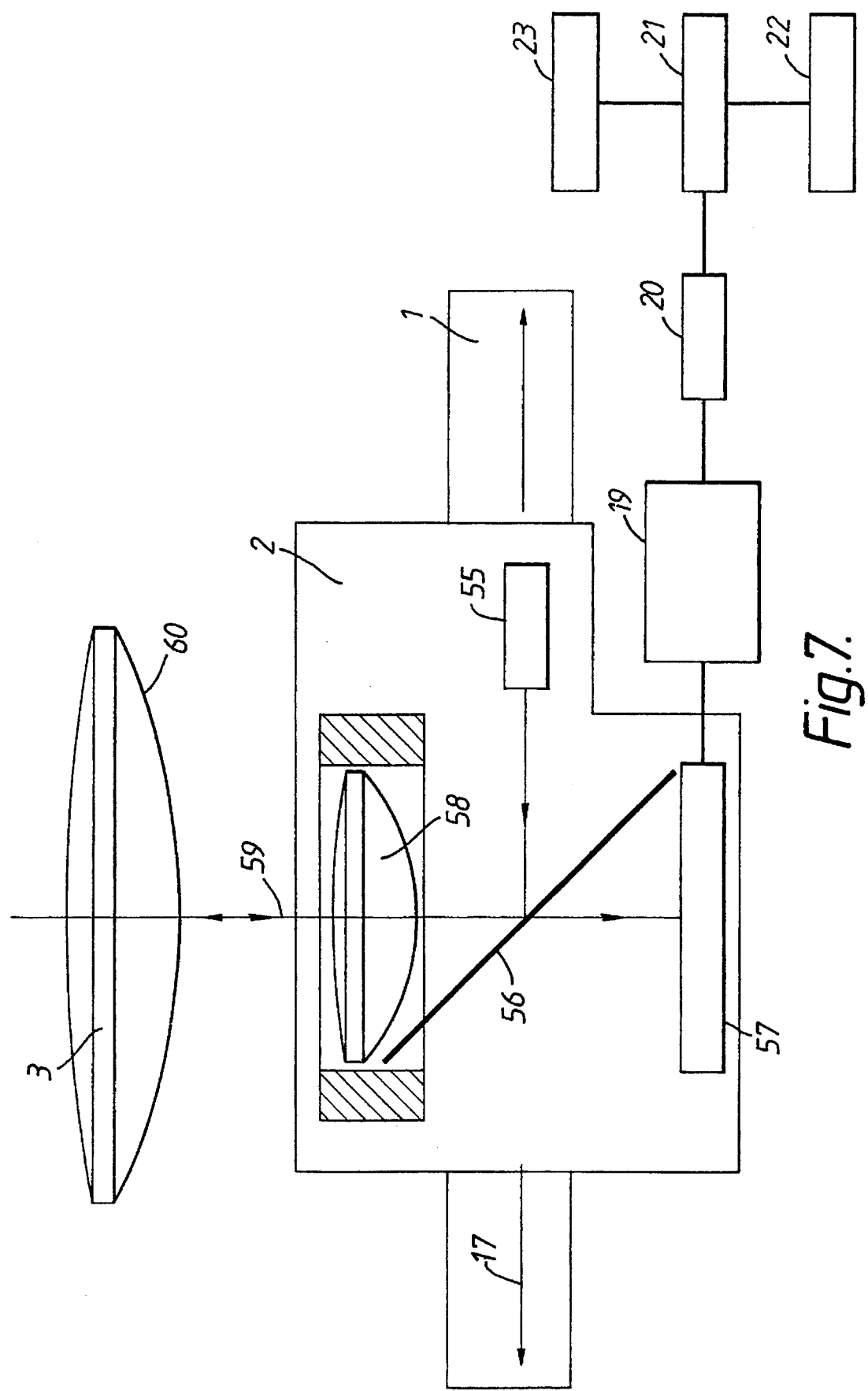
FIG. 7 is a block schematic diagram of apparatus for measuring the surface quality of a lens as well as its curvature.

Although this invention is concerned primarily with the measurement of curvature and more particularly with the curvature of lenses, the apparatus may be adapted for surface quality measurement as shown in FIG. 7.

Referring now to FIG. 7, wherein corresponding parts of the apparatus bear the same numerical designations as FIG. 1, a light source 55 is used in conjunction with a beam splitter 56, an optical light detector array 57 and a transform lens 58 scan a beam 59 across the surface 60 of the lens 3 under test. This is achieved by movement of the platform 2 with respect to the optical bench 1. Whereas in the arrangements thus far described the transform lens 58 is fixed focused, in the present arrangement the transform lens is arranged to be automatically focused on the surface whilst scanning across the surface. Thus a reflected return from the surface is imaged onto the detector and deviations from the expected position are noted. The deviations are caused by surface quality defects, e.g. roughness, and may be stored for subsequent analysis and output as a measure of the surface quality.

Figure 8:
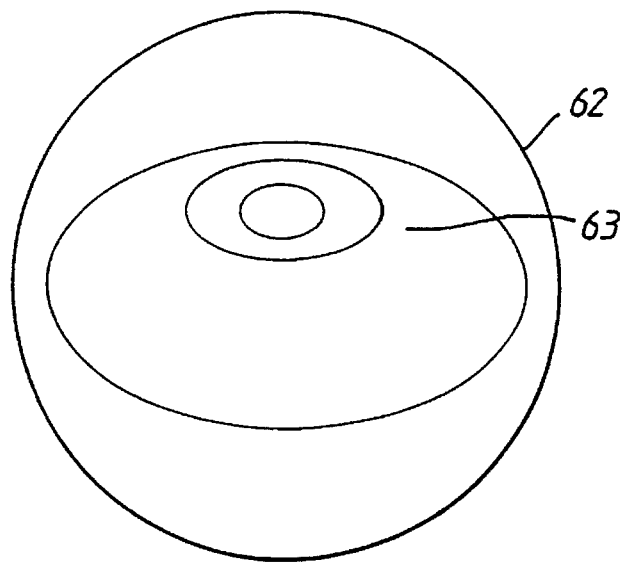
FIG. 8 shows one form of display which may be afforded by apparatus as hereinbefore described with reference to FIG. 1 for example.

Although the processor 21 and display may take various forms, FIG. 8 shows one presentation of the output signal from the processor 21 by the display 23. It takes the form of a contour plot of the measured surface whose periphery is indicated by a circular line 62. This plot enables an easy and accurate assessment to be made of the surface form and figure. The contours 63, indicate the deviation in height that the measured surface has from that which is desired. Other forms of output could include interferograms, e.g. plots of fringes under monochromatic illumination, profile plots, e.g. plots showing variation in radius relative to the required radius, and 3-D surface plots.

Various modifications may be made to the arrangements hereinbefore described without departing from the scope of the invention and for example it will be appreciated that light at any frequency may be used in the visible or non-visible spectrum and that alternative sources of electromagnetic radiation may be used in accordance with the particular application in view.

I claim:

1. An apparatus for measurement of a radius of curvature of a surface of an object having a plurality of at least partially reflective surfaces comprising:

at least one source of electromagnetic radiation, electromagnetic radiation detector means for detecting electromagnetic radiation, transforms means positioned and arranged for focusing and displacing a beam of radiation, according to its incident angle, reflected from at least one of said plurality of surfaces onto said detector means, said detector means being arranged to provide at least one output signal from each of said plurality of surfaces characteristic of at least one displaced position thereon at which the radiation is incident, signal processor means, responsive to said at least one output signal, for providing a measurement of said radius of curvature at each of the plurality of surfaces, and an additional light detector for detecting an additional beam from a further source and arranged to provide signals for the signal processor means when said additional beam is normal to at least one of the plurality of surfaces.

2. An apparatus as claimed in claim 1, wherein said at least one source comprises a light radiator.

3. An apparatus as claimed in claim 2, wherein the light radiator is a laser.

4. An apparatus as claimed in claim 1, and further comprising a beam splitter via which light radiation from the at least one source is directed onto the surfaces, the beam splitter being positioned between the detector means and the surfaces.

5. An apparatus as claimed in claim 4, wherein the beam splitter is positioned between the transform means and at least one of the surfaces.

6. An apparatus as claimed in claim 4, wherein the beam splitter is positioned between the detector means and the transform means.

7. An apparatus as claimed in claim 1, wherein the apparatus is mounted on an optical bench for movement in a plane substantially orthogonal to an optical axis of the transform means.

8. An apparatus as claimed in claim 1, wherein the apparatus is arranged to be hand held.

9. An apparatus as claimed in claim 8, wherein the additional light detector is arranged to be responsive to light from the at least one source which is directed onto at least one of the plurality of surfaces via a further beam splitter and via which further beam splitter light reflected from the at least one of the plurality of surfaces is arranged to pass to said additional light detector.

10. An apparatus as claimed in claim 9, wherein the additional light detector is arranged to be responsive to light reflected from the at least one of the plurality of surfaces and originating from a further light source, light from said further light source being directed to and from the at least one of the plurality of surfaces via a further beam splitter.

11. An apparatus as claimed in claim 1, wherein the detector means comprises an array of photosensitive elements, signals from which provide an indication of the position thereon whereat light is incident.

12. An apparatus as claimed in claim 1, wherein said apparatus is arranged to be stationary and said surfaces are arranged to be moved in a plane substantially orthogonal to the optical axis of the transform means.

13. An apparatus as claimed in claim 1, wherein a first part of said apparatus is arranged to be hand held and a second part of said apparatus is not hand held, and further comprising communication means for passing signals from said first part to said second part.

* * * * *